United States Patent [19]

Budrys et al.

[11] 3,766,324

[45] Oct. 16, 1973

[54] AUXILIARY SWITCHING SYSTEM CONTROLLED BY REGULAR TELEPHONE SWITCHING SYSTEM

[75] Inventors: Ignas Budrys, Lincoln, Nebr.; Ernest O. Lee, Jr., Fairport; William W. Pharis, Rochester, both of N.Y.

[73] Assignee: Stromberg-Carlson Corporation, Rochester, N.Y.

[22] Filed: Oct. 26, 1971

[21] Appl. No.: 192,212

[52] U.S. Cl. ............................ 179/18 E, 179/2 TV

[51] Int. Cl. ......................................... H04m 11/00

[58] Field of Search............... 179/18 E, 2 R, 2 TV, 179/2 DP, 18 FG, 18 FF, 18 FH

[56] References Cited

UNITED STATES PATENTS

| | | | |
|---|---|---|---|
| 3,662,110 | 5/1972 | Van Fossen et al. | 179/2 TV |
| 3,612,767 | 10/1972 | Anderson et al. | 179/2 TV |
| 3,573,377 | 4/1971 | Anderson et al. | 179/2 TV |
| 3,335,226 | 8/1967 | Michael et al. | 179/2 R |
| 3,151,219 | 9/1964 | Ellis et al. | 179/18 FH |
| 3,701,849 | 10/1972 | Stapleton | 179/2 TV |

FOREIGN PATENTS OR APPLICATIONS

| | | | |
|---|---|---|---|
| 1,940,193 | 2/1970 | Germany | 179/18 FH |

*Primary Examiner*—Thomas W. Brown
*Attorney*—Charles C. Krawczyk

[57] ABSTRACT

In combination with a regular telephone switching system for establishing a first electrical path, such as an audio path, between any two stations in a plurality of stations, an auxiliary switching system is provided for establishing between the two stations a second independent electrical path suitable, for instance, for video transmission and reception. After the establishment of the first electrical path, signals received via the first path through the regular telephone switching system are used in the auxiliary switching system to generate mark signals which identify the two stations to be interconnected via the second path. Switching means are provided to complete the interconnection between the two stations in response to the mark signals.

12 Claims, 6 Drawing Figures

Patented Oct. 16, 1973 3,766,324

6 Sheets-Sheet 1

IGNAS BUDRYS
ERNEST O. LEE JR.
WILLIAM W. PHARIS
INVENTORS

BY

Charles C. Krawczyk

ATTORNEY

Patented Oct. 16, 1973 3,766,324

6 Sheets-Sheet 2

IGNAS BUDRYS
ERNEST O. LEE JR.
WILLIAM W. PHARIS
*INVENTORS*

BY

*ATTORNEY*

Patented Oct. 16, 1973

3,766,324

6 Sheets-Sheet 3

IGNAS BUDRYS
ERNEST O. LEE JR.
WILLIAM W. PHARIS
*INVENTORS*

BY

Charles C. Krawczyk
ATTORNEY

Patented Oct. 16, 1973 3,766,324

6 Sheets-Sheet 4

IGNAS BUDRYS
ERNEST O. LEE JR.
WILLIAM W. PHARIS
*INVENTORS*

*BY*

Charles C. Krawczyk

ATTORNEY

Patented Oct. 16, 1973 3,766,324

6 Sheets-Sheet 5

IGNAS BUDRYS
ERNEST O. LEE JR.
WILLIAM W. PHARIS
*INVENTORS*

BY

[signature]
ATTORNEY

Patented Oct. 16, 1973

3,766,324

6 Sheets-Sheet 6

IGNAS BUDRYS
ERNEST O. LEE JR.
WILLIAM W. PHARIS
*INVENTORS*

*BY*

Charles C. Kavanagh
ATTORNEY

AUXILIARY SWITCHING SYSTEM CONTROLLED BY REGULAR TELEPHONE SWITCHING SYSTEM

BACKGROUND OF THE INVENTION

This invention relates to switching systems for establishing an electrical connection between any two stations in a plurality of stations. Specifically, the invention relates to an auxiliary switching system for establishing a second independent electrical connection between any two selected stations after a first electrical connection is established therebetween by a first and independent switching system. This invention has particular utility in a telephone network serving video telephone subscribers wherein the first electrical connection is used for audio transmission and reception and the second electrical connection is used for video transmission and reception.

With the advent of video telephone communication service, comes a need for providing the necessary switching to establish the video connection in a video telephone call. In video telephone communication, the video information is transmitted and received over a transmit pair and receive pair of conductors, respectively, while the audio information is transmitted and received over a different pair of conductors. To modify the teleophone switching matrices in existing telephone switching systems to be compatible with video telephone communication as well as telephone communication would be a formidable task, as well as an extremely expensive one, especially in view of the amount of equipment involved and the wiring and physical congestion problems associated therewith. Although the telephone switching matrices could be replaced with switching matrices designed entirely or partially for video telephone service, this alternative would be even more expensive and certainly unwarranted when considered in light of the very small percentage of present telephone subscribers who are expected to subscribe to video telephone service, at least in the initial years of its availability. Consequently, in view of the foregoing, it has been found economically desirable to supplement a telephone switching system with a completely separate video switching system for establishing the video connection in a video telephone call rather than to modify the telephone switching matrix or replace it to perform that function. In this way, the size of the video switching system can be economically tailored to changing traffic demands brought about by expected greater usage of video telephone service in the future.

It is therefore an object of the present invention to provide an auxiliary switching system for establishing a second independent electrical connection between any two stations in a plurality of stations in response to control signals from another separate switching system which establishes a first electrical connection therebetween.

It is a further object of this invention to provide an auxiliary video switching system to supplement a telephone switching system wherein the latter establishes an audio connection between two video telephone subscribers and thereafter the former establishes a video connection therebetween.

It is still a further object of this invention to provide an auxiliary video switching system which can be facilely added to an existing telephone switching system for providing a video connection between any two video telephone subscribers after the latter system establishes an audio connection therebetween.

BRIEF DESCRIPTION OF THE INVENTION

An auxiliary switching system operates in combination with a first switching system, such as a telephone switching system, to establish an auxiliary electrical path, such as a video path, between any two stations in a plurality of stations after the establishment therebetween of a first electrical path, such as an audio path, by the first switching system. Circuit means are provided in the auxiliary system for identifying the two stations to be interconnected via the auxiliary path from mark signals generated in response to signals received over the first electrical path via the first switching means. When the first switching system is a telephone system, these signals include those signals which would ordinarily accompany an audio connection; namely, sleeve grounds and ringing. Switching means are also provided for effectuating the auxiliary connection in response to the mark signals received from the circuit means.

DESCRIPTION OF THE PREFERRED EMBODIMENT

Figure 1:
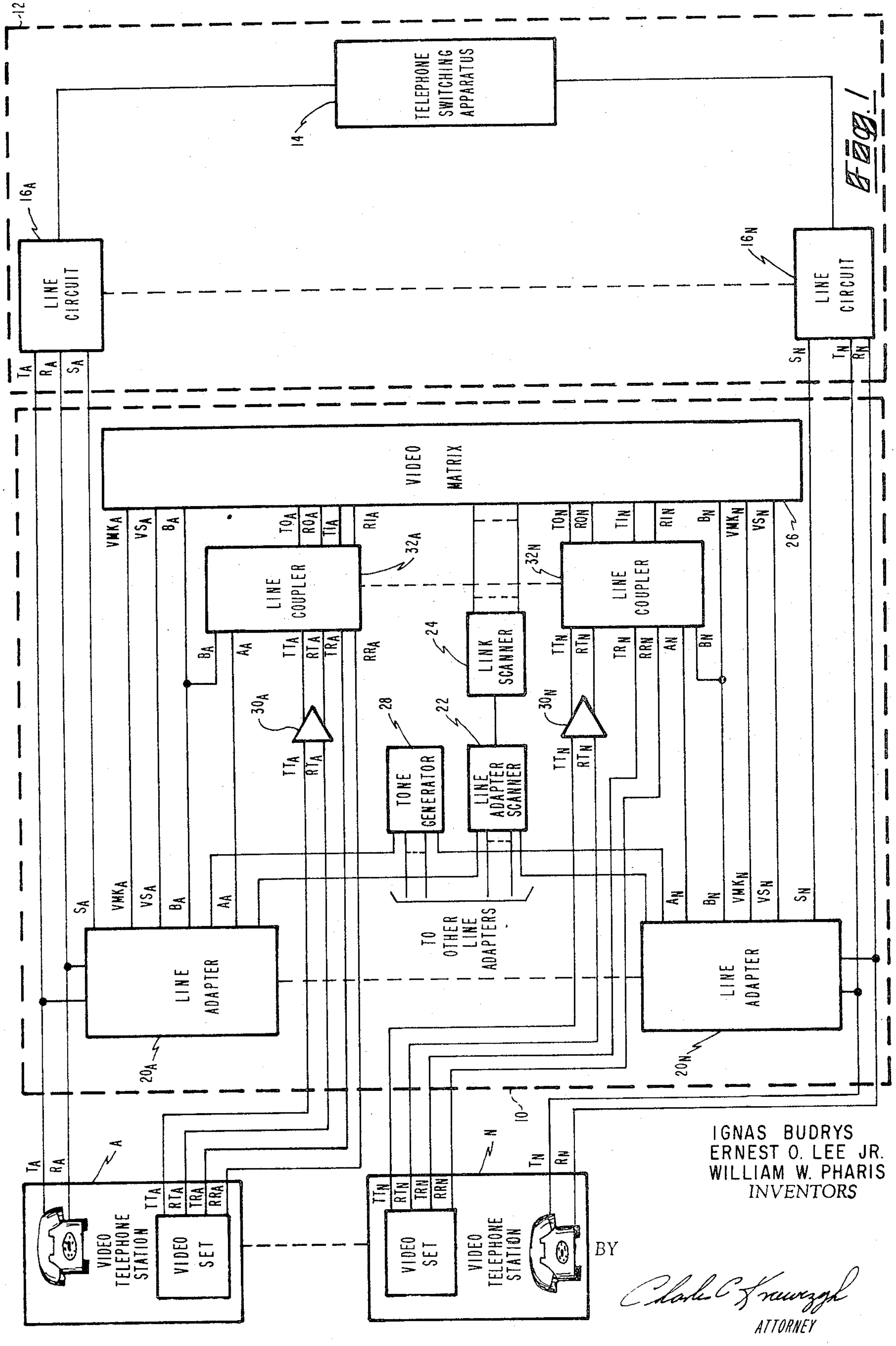
FIG. 1 shows a block diagram of the auxiliary switching system of the invention designed specifically to supplement a telephone switching system for providing a video connection after an audio connection is established.

FIG. 1 shows a block diagram of an auxiliary switching system 10 suitable for video service and a telephone switching system 12 which are designed to accommodate a number of video telephones, each located at a different one of a plurality of video telephone stations A-N. Each station is provided with six wires, two for audio transmission (T and R), two for video transmission (TT and RT) and two for video reception (TR and RR). The subscripts in FIG. 1 serve to identify the particular station to which the wires are connected. Any station A-N can be the calling party while any other station can be the called party. However, for the following description it will be assumed that a two-way video telephone connection is being established between stations A and N and that the calling party is at station A and the called party is at station N. It should be borne in mind that the audio and video paths are completely separate, and that the auxiliary switching system 10 estabishes the video connection after the audio path is established by the telephone switching system 12.

In a well known manner, an audio connection is established between station A and the switching system 12 by the telephone switching apparatus 14 via the customary telephone tip and ring conductors TA and RA, respectively, and a line circuit 16A associated with station A. Thereafter, dial tone is provided to station A so that dialing may be commenced. Assuming that station N is free, when dialing is completed, station N is connected to the switching system 12 via conductors TN and RN and its associated line circuit 16N so that a ringing signal can be applied. When the called party at station N answers, the audio path between stations A and N is completed, the connection having been established through the telephone switching system 12. Once this path is established, the auxiliary switching system 10 begins functioning to establish a video path between stations A and N.

Each video telephone station has associated therewith an individual line adapter (20A–20N), line coupler (32A–32N) and amplifier (30A–30N), these components all being centrally located in the auxiliary switching system 10. In addition, the auxiliary system 10 utilizes the following common equipment: a line adapter scanner 22, a link scanner 24, a video switching matrix 26 and a tone generator 28. After discussing the auxiliary system 10 generally to provide an overall undestanding of its operation, each major component will be discussed in detail with the exception of the tone generator 28 and amplifier 30, which are well known in the art.

A line adapter 20N, associated with station N, responds to the completion of the audio path at the called terminal by generating a signal which is detected by the line adapter scanner 22 connected to all the line adapters in the system. This initiates a scanning process whereby the line adapter scanner 22 searches for and identifies which one of the line adapters is requesting service. When the appropriate line adapter is identified (line adapter 20N herein), the line adapter scanner 22 stops scanning and applies a mark enable signal which causes the line adapter (20N) to be marked for path finding purposes and also causes the link scanner 24 to begin scanning for an idle link in the video matrix 26.

The mark enable signal applied to line adapter 20N enables the tone generator 28 which is connected to all the line adapters in the system to transmit a tone through line adapter 20N back to a line adapter 20A, associated with station A, along the tip conductor of the audio path interconnecting stations A and N. The audio path is described by conductor TN, line circuit 16N, the telephone switching apparatus 14, line circuit 16A and conductor TA. Upon receipt of this tone, line adapter 20A is marked via the mark enable signal applied by the line adapter scanner 22 (although this mark enable signal is applied to all line adapters simultaneously, only the two line adapters involved in the connection are marked since they are the only ones in which mark signals are generated at this time, each connection being processed one at a time). With both line adapters 20A and 20N marked and a free link in the video matrix 26 found, the contacts of the video matrix crosspoints are closed, thus, establishing the video path between stations A and N. The crosspoints are held during the call by signals generated in the line adapters 20A and 20N which are initiated by a sleeve signal from the line adapter scanner 22. This releases the line adapter scanner 22, subsequently making it available to process the next connection or if there be none present, to await the next service request.

Since video service requires two pairs of conductors for each subscriber (one pair of tip and ring conductors for transmitting and one pair of tip and ring conductors for receiving) stations A and N are interconnected by a video path which includes conductors TTA, RTA, TRA, RRA and TTN, RTN, TRN, RRN, respectively, and the video matrix 26. The video path also includes amplifiers 30A and 30N shown preferably in series with the respective transmission conductors of stations A and N to compensate for transmission losses and line couplers 32A and 32N connected in series with all the respective video conductors of stations A and N. The line couplers 30A and 30N are designed to coordinate the connection of the two pairs of video conductors from station A and N through the video matrix 26 so that the transmit pair from one station (TTA and RTA from station A, for instance) is connected to the receive pair from the other station (TRN and RRN from station N). Similarly, the transmit pair from station N (TTN and RTN) are connected to the receive pair of station A (TRA and RRA) through line couplers N and A, respectively.

Figure 2:
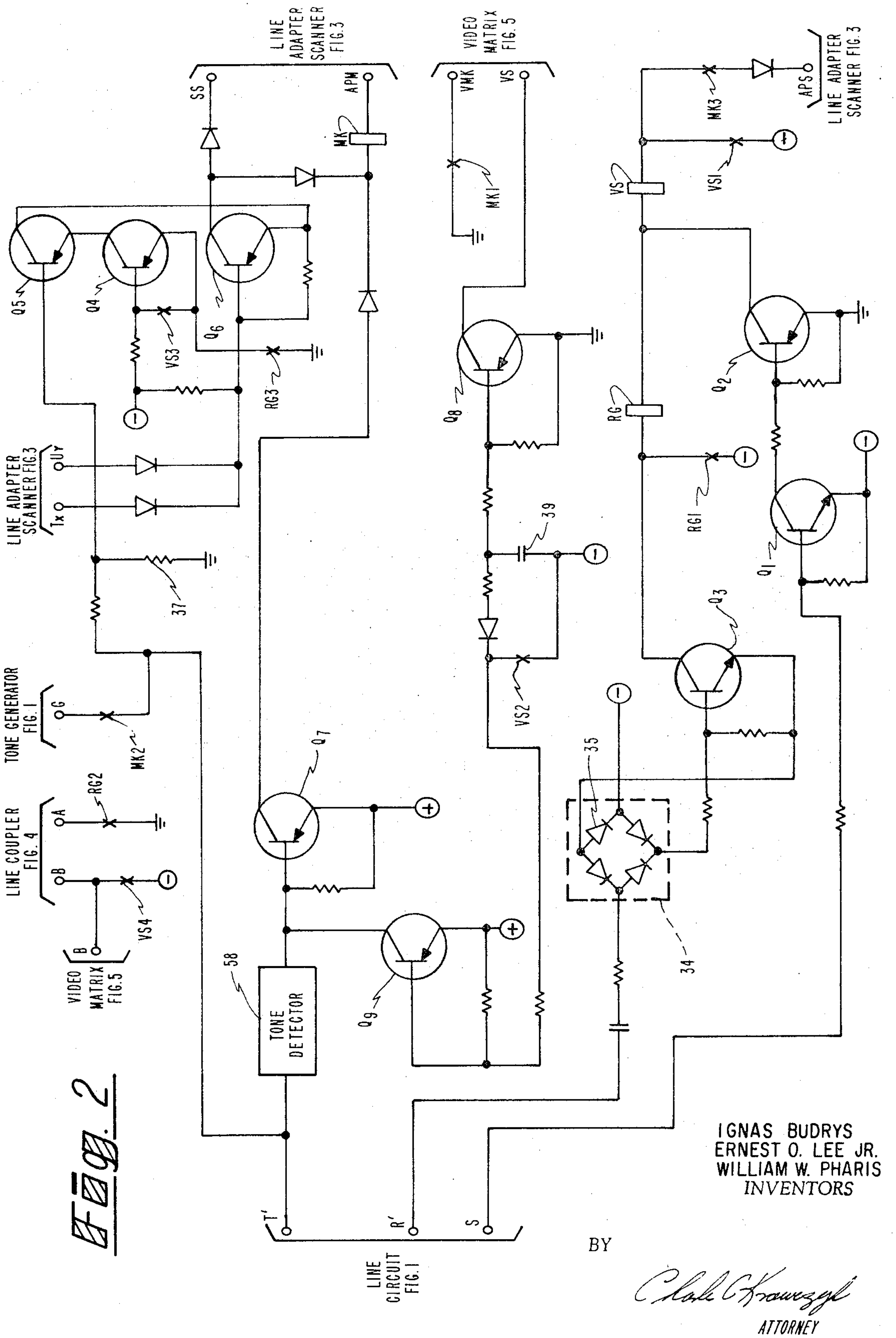
FIG. 2 shows the details of a line adapter of FIG. 1.

Each of the major components will now be discussed in detail beginning with the line adapter (20A–20N). Since only one line adapter is assigned to each video telephone station, every line adapter must be capable of performing the different functions required by both an originating (calling station) and terminating (called station) video telephone call. Consequently, all line adapters have the same structure. As shown in FIG. 2, thirteen leads are provided for connecting a line adapter to the other various components of the auxiliary system 10. Leads T′ and R′ connect the line adapter to the tip (T) and ring (R) conductors of the associated station extending to the associated line circuit (16A–16N). Lead S connects the line adapter to the sleeve lead of its associated line circuit. Three leads VMK, VS and B connect the line adapter to the video matrix 26. The line adapter is connected to the line adapter scanner 22 through five leads identified as SS, APM, APS, Tx and Uy where $x$ and $y$ uniquely identify each line adapter, $x$ corresponding to the tens digit and $y$ to the units digit. Lead G connects the line adapter to the tone generator 28. The line adapter is connected to its respective line coupler through the remaining lead A and also the B lead.

Since the establishment of the video path begins with the line adapter at the called end of the connection (station N) the operation of line adapter 20N will be described first. Before telephone ringing is applied at station N to advise the subscriber of a call, a ground is applied to the sleeve lead of line circuit 16N (FIG. 1) by the telephone switching apparatus 14. This ground which appears on the S lead throughout the duration of the call renders a transistor Q1 (FIG. 2) of line adapter 20N conductive, thus, forward biasing a transistor Q2, the base of which is connected to the collector of transistor Q1. Since there is not yet a closed path for the collector-emitter current of transistor Q2, this transistor remains non-conductive.

The AC ringing signal which is applied through the R lead of line circuit 16N for signalling the subscriber at station N is also applied to line adapter 20N via lead R′ where it is converted to a DC signal by a rectifying circuit 34 which forward biases a transistor Q3. Current now flows from transistor Q2, the coil of a relay RG, the transistor Q3 to a negative DC potential applied to the emitter of transistor Q3 through a diode 35 in the rectifying circuit 34. This actuates the RG relay of line adapter 20N. The closing of contacts RG1 connects the coil of relay RG directly to a negative DC terminal so that the RG relay remains energized even after the ringing signal terminates when the called party at station N answers the call. Contacts RG2 close to apply a ground to line coupler 32N via the A lead of line adapter 20N. Contacts RG3 close to apply a ground to the emitter of a transistor Q4 whose collector-emitter path is connected in series with the collector-emitter paths of two other transistors Q5 and Q6. Although transistors Q4 and Q6 are forward biased by a negative DC potential at their bases, current flow through their collector-emitter paths is blocked by the cutoff of transistor Q5 whose base is grounded through a resistor 37. The base of transistor Q5 is also connected to the T (tip) conductor of the audio path between stations A and N via lead T' of line adapter 20N. When the subscriber at station N responds to the call, the closing of his hookswitch completes a DC path which applies a negative potential via the T' lead to the base of transistor Q5, forward biasing this transistor and rendering it conductive. The collector of transistor Q6 is connected to the line adapter scanner 22 via lead SS which provides a path for the flow of current through the series collector-emitter paths of transistors Q4, Q5 and Q6 from the ground connected to the emitter of transistor Q4. Consequently, when the called party at station N answers the call, the line adapter scanner 22 detects a ground on the SS lead which initiates the scanning operation to locate the particular line adapter (20N) requesting service. Since the line adapter scanner 22 is connected to the SS lead of all line adapters in the auxiliary system 10, a ground signal on any one SS lead will start the scanning operation.

Figure 3:
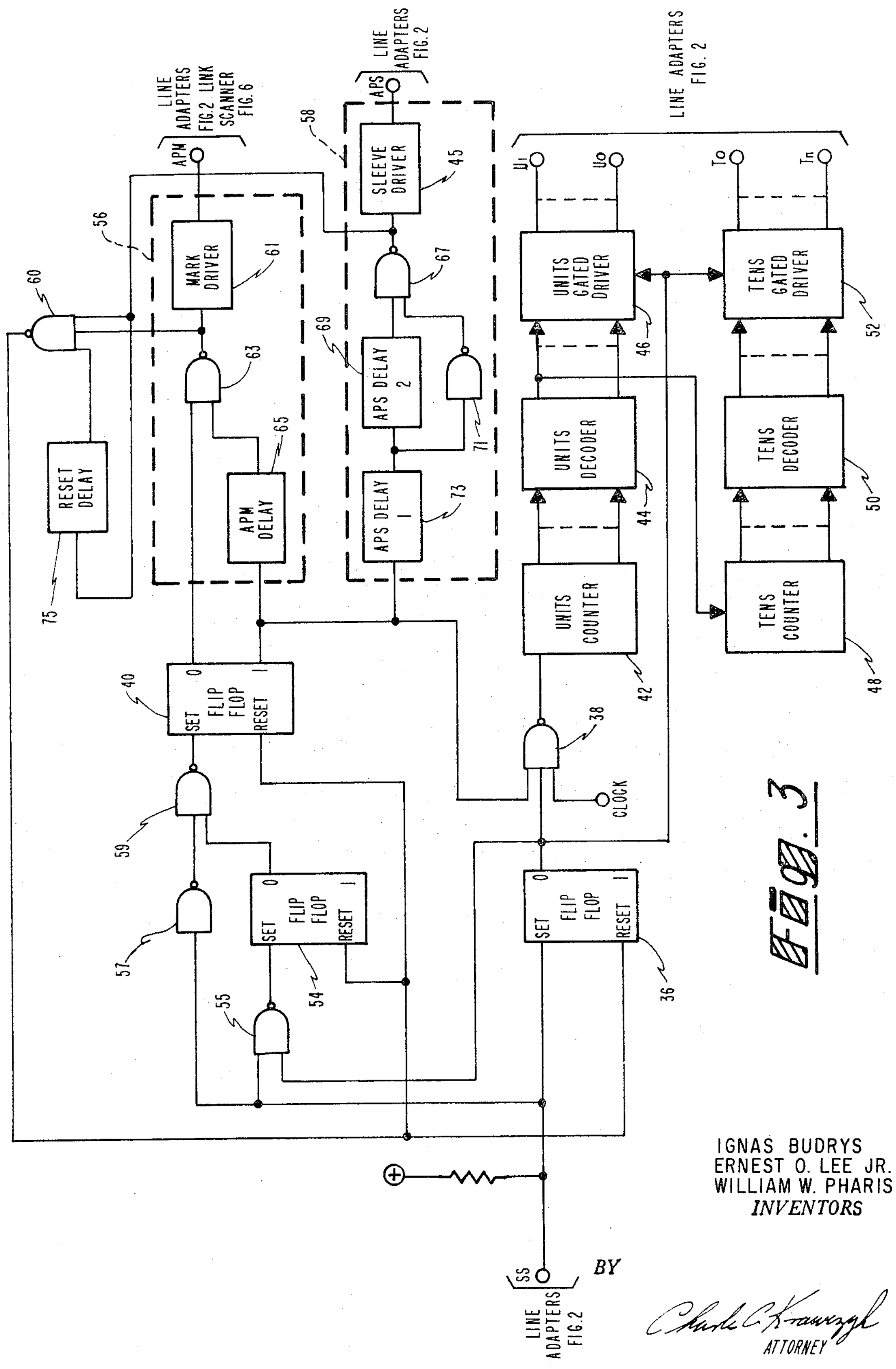
FIG. 3 shows logic details of the line adapter scanner of FIG. 1.

Referring to FIG. 3, which shows the details of the line adapter scanner 22, the ground on the SS lead (from line adapter 20N), sets a flip-flop 36 which applies an enable signal to a NAND gate 38. A second input to the NAND gate 38 derived from another flip-flop 40 also provides an enable signal so that clock pulses applied to the NAND gate 38 are transmitted to a units counter 42. The output of the units counter 42 is decoded by a units decoder 44 whoe output is, in turn, applied to a units gated driver 46 which has ten output leads U1–U0, the subscript corresponding to the line adapter units designation *y* of lead U*y*. The signal on the first output lead of the units decoder 44 is also used to control the operation of a tens counter 48 whose output is decoded by a tens decoder 50 which controls a tens gated driver 52. The tens gated driver 52 has a plurality of output leads T0–T*n*, the subscript corresponding to the line adapter tens designation *x* of T*x*.

The line adapters are arranged in groups of ten, there being T*n* groups. As shown in FIG. 2, each line adapter has two connections to the line adapter scanner 22 marked T*x* and U*y* and both of which serve as an input to the base of transistor Q6. The Uy leads of each of the line adapters in a group are connected to different ones of the ten output leads U1–U0 of the units gated driver 46 while the T*x* leads of all line adapters in the same group are connected to the same one of the plurality of output leads T0–T*n* of the tens gated driver 52. Each of the T0–T*n* output leads is connected to a different group of line adapters so that each line adapter in the system can be uniquely identified by its leads U*y* and T*x*, there being only one combination for each line adapter.

Before the line adapter scanning process is initiated by the appearance of a ground on the SS lead of the line adapter scanner 22, there is no signal from the units gated driver 46 and the tens gated driver 52 on any of the respective output leads U1–U0 and T0–T*n*. This enables transistor Q6 since the negative potential at its base forward biases it, permitting the ground via contacts RG3 to be forwarded through its collector-emitter path to the SS lead when transistor Q5 is rendered conductive. When the line adapter scanner 22 begins operating in response to this ground, a positive DC potential is placed on all but one of the T*o*–T*n* leads which reverse biases all the Q6 transistors connected to these leads. Only in that one group of line adapters whose Tx leads are connected to the open circuited lead (T*o*–T*n*) of the line adapter scanner 22 will the Q6 transistors be rendered conductive. Each of the (T*o*–T*n*) leads is sequentially open circuited until the line adapter of the called station (N), which is requesting service, is identified.

During the period that a particular output lead (T*o*–T*n*) from the tens gated driver is open circuited, a positive DC potential is placed on all but one of the U1–U0 leads, reverse biasing all the Q6 transistors of the line adapters in the enabled group except the one whose U*y* lead is open circuited. If the particular line adapter whose U*y* lead (and T*x* lead) is open circuited is the one requesting service, the ground via contacts RG3 will appear on the SS lead since transistor Q6 is enabled by the absence of a positive voltage on both these leads. If the particular line adapter being checked is not the one requesting service, its RG3 contacts will be open and, consequently, no ground will appear on the SS lead even though transistor Q6 is rendered conductive. The units gated driver 46 sequentially enables each of the U1–U0 leads beginning with U1 and ending with U0 while the tens gated driver 52 is paused at a particular T*o*–T*n* lead. If no ground is detected at the SS lead, the units gated driver 46 repeats the process while the tens gated driver 52 pauses at the next T*o*–T*n* lead. This continues until the line adapter scanner 22, once having been set in operation by the first ground appearance on the SS lead, detects a second ground appearance (uniquely identifying the line adapter requesting service).

The removal of the first ground appearance on the SS lead by the initiation of the scanning operation together with the output of flip-flop 36 causes a flip-flop 54 in the line adapter scanner 22 to be set via a NAND gate 55 preparatory to the second ground appearance. The second ground appearance on the SS lead via a NAND gate 57 together with the output of the set flip-flop 54, sets flip-flop 40 via a NAND gate 59 which sends back a disable signal to NAND gate 38, thus, inhibiting it from transmitting clock pulses to the units counter 42 and terminating the scanning process. The identification of the line adapter requesting service (line adapter 20N) is now complete.

In addition to stopping the scanning operation, the setting of flip-flop 40 (FIG. 3) causes an enable signal to trigger a mark signal generator 56 in the line adapter scanner 22 which produces a negative pulse of predetermined duration, such as five milliseconds on the APM lead. This enable signal is applied to a mark driver circuit 61 via a NAND gate 63 which has two inputs, one connected directly to the 0 output of flip-flop 40 and the other connected to the 1 output of flip-flop 40 through an APM delay circuit 65. The setting of the APM delay circuit 65 determines the duration of the APM pulse. The APM delay circuit 65 terminates the APM pulses by applying a disable signal to NAND gate 63 which causes its output to revert back to the same level as existed just prior to the initiation of the pulse.

The APM pulse is applied to one terminal of a coil of a mark relay MK in line adapter 20N (FIG. 2). The other terminal of the coil is connected to the SS lead so that the second ground appearance on the SS lead completes a path for operating the mark relay MK. Relay MK, when operated, closes contacts MK1 which applies a ground via the VMK lead to the video matrix 26, thus, marking line adapter 20N for path finding purposes (the video matrix connections are discussed below).

The operation of the MK relay also closes contacts MK2 interconnecting the tone generator 28 (FIG. 1) and the T' lead of line adapter 20N through lead G so that a tone is transmitted back to line adapter 20A along the T (tip) conductor of the audio path between stations A and N. A tone detector 58 in line adapter 20A responds to the tone by applying an enable signal to the base of a transistor Q7 rendering it conductive. The collector-emitter path of transistor Q7 being in series with the coil of the mark relay MK, renders the relay MK of line adapter 20A operative since the mark signal of the line adapter scanner 22 is present on its APM lead (remembering that the mark enable signal is applied to all the line adapter APM leads simultaneously). Operation of this MK relay closes contacts MK1 applying a ground via the VMK lead to the video matrix 26, thus, marking line adapter 20A for path finding purposes.

In addition to actuating the mark signal generator 56, the setting of flip-flop 40 (FIG. 3) also actuates a sleeve signal generator 58 producing a negative pulse similar to the mark enable signal which is slightly delayed thereafter. The sleeve signal generator 58 is actuated by an enable signal applied to a sleeve driver circuit 45 via a NAND gate 67 which has two inputs, one connected to the output of a No. 2 APS delay circuit 69 and the other connected to the input of the No. 2 APS delay circuit 69 through an inverter circuit 71. The input of the No. 2 APS delay circuit 69 is connected to the 1 output of flip-flop 40 through a No. 1 APS delay circuit 73. The setting of the No. 2 APS delay circuit 69 determines the duration of the APS pulse while the setting of the No. 1 APS delay circuit 73 determines the time delay between the initiation of the APM pulse and the initiation of the APS pulse. This time delay is less that the duration of the APM pulse, such as three milliseconds, so that there is a time period in which the APM and APS pulses overlap one another.

The APS pulse, applied to both line adapters 20A and 20N at the same time via their respective APS leads, energizes a relay VS through a path which includes closed contacts MK3 (the mark relays MK in line adapters 20A and 20N are still operated at this time since the mark signal pulse via the APM leads is still present) and the collector-emitter path of transistor Q2 to ground. Transistor Q2 of line adapter 20A is forwad biased by the conduction of current through transistor Q1 as a result of the ground appearing on the SA lead from line circuit 16A. This ground, which was applied when the subscriber at station A initiated the call, remains throughout the duration of the call.

Contacts VS1 of the VS relays close to maintain the VS relays energized from a negative DC potential after the signal via the APS leads is terminated. Contacts VS2 close to apply a negative DC potential to the base of a transistor Q8 forward biasing this transistor. The conduction of transistor Q8 applies the ground at its emitter terminal through its collector to the video matrix 26 via the VS lead which holds the contacts of the video matrix crosspoints (discussed in detail below) operated. The negative potential via the VS2 contacts is used to forward bias a transistor Q9, the collector output of which cuts off transistor Q7 (in line adapters 20A and 20N). This is a precautionary measure which ensures that after the MK mark relays are deactuated (by the termination of the negative pulse on the APM leads) a possible false tone detected by the tone detector 58 does not reactuate the MK relay. A capacitor 39 connected in the biasing circuit of transistor Q8 maintains this transistor briefly operated after the VS2 contacts open upon completion of the video telephone call. This holds the video matrix crosspoints momentarily while the rest of the video connection is broken. Since the crosspoint contacts are usually of the dry reed type and cannot interrupt current, this is an important feature.

The closing of contacts VS3 across the base and emitter of transistor Q4 cuts this transistor off in line adapter 20N. This prevents the ground via contacts RG3 from appearing on the SS lead which subsequently releases the line adapter scanner 22 and prepares it for processing the next scan request. This preparation is accomplished by resetting flip-flops 36, 40 and 54 (FIG. 3) through a reset signal from a NAND gate 60 which has three inputs, one connected to the input of the mark driver circuit 61, one connected to the input of the sleeve driver circuit 45 and the other connected to the output of a reset delay circuit 75. The input of the reset delay circuit 75 is connected to the input of the sleeve driver circuit 45. NAND gate 60 generates a reset signal only when all three of its input signals are high. The respective signals from the inputs to the driver circuits 61 and 45 are high only when these circuits are disabled (during the absence of the APM and APS pulses). The signal from the reset delay circuit 75 is high only momentarily just after the APS pulse terminates. Since during this momentary period the inputs to the driver circuits 61 and 45 are also high, NAND gate 60 is enabled so that it produces a reset signal. During all other periods it is inhibited from producing the reset signal.

Figure 4:
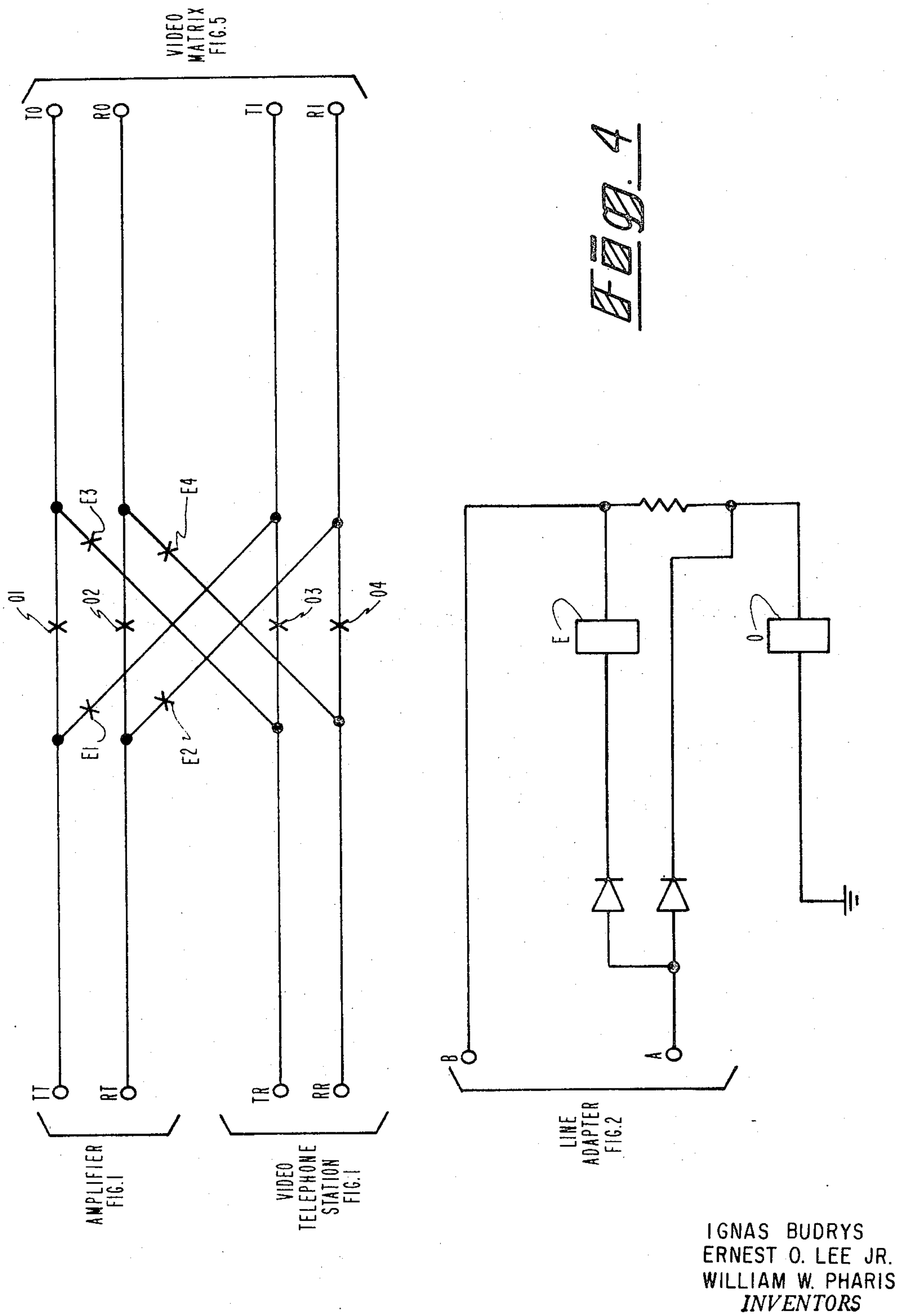
FIG. 4 shows the details of a line coupler of FIG. 1 through which the video conductors are connected to the video switching matrix.

Contacts VS4 close to apply a negative DC potential to the line couplers associated with the respective line adapters via the B leads (the application of this negative DC potential to the video matrix 26 as well, is discussed later). As previously pointed out, each line adapter has an associated line coupler for coordinating the video connections through the video matrix 26 to ensure that the transmit pair of one station is connected to the receive pair of the other station. Referring to FIG. 4, it is seen that each line coupler comprises two relays, O (originating) and E (ending) which function to control the crossover circuit shown. The negative DC potential applied to the line coupler 32A (corresponding to the calling station A) via the B lead through the closed contacts VS4 of line adapter 20A energized the coil of relay O, one terminal of which is connected to ground. This closes all the 01–04 contacts in the crossover circuit of line coupler 32A connecting the TTA, RTA, TRA and RRA leads of station A to the respective T0A, R0A T1A and R1A leads of the video matrix 26. Relay E of line coupler 32A does not operate in response to the negative potential on the B lead since there is no closed path for the current to flow. This is so because the A lead of line coupler 32A is open since the contacts RG2 of the RG relay in line adapter 20A are open. Recalling that the RG relay responds to the ringing signal only, the RG relay of line adapter 20A never operated during the call in our example since this line adapter corresponds to the calling station (station A).

On the other hand, the RG relay of line adapter 20N is operated, since in our example, this line adapter corresponds to the called station (station N). The negative DC potential applied via the B lead and the ground applied via the A lead of line coupler 32N actuates the E relay therein, closing the E1–E4 contacts in its crossover circuit. This connects the TTN, RTN, TRN and RRN leads of station N to the respective T1N, R1N, T0N and R0N leads of the video matrix 26. Consequently, through the common link connections of the video matrix 26 (T0, R0, T1 and R1) the TTA, RTA, TRA and RRA leads of station A are connected to the respective TRN, RRN, TTN and RTN leads of station N. The 0 relay of line coupler 32N does not operate in response to the negative potential on the B lead since the ground on the A lead shorts out the coil of relay 0.

Figure 5:
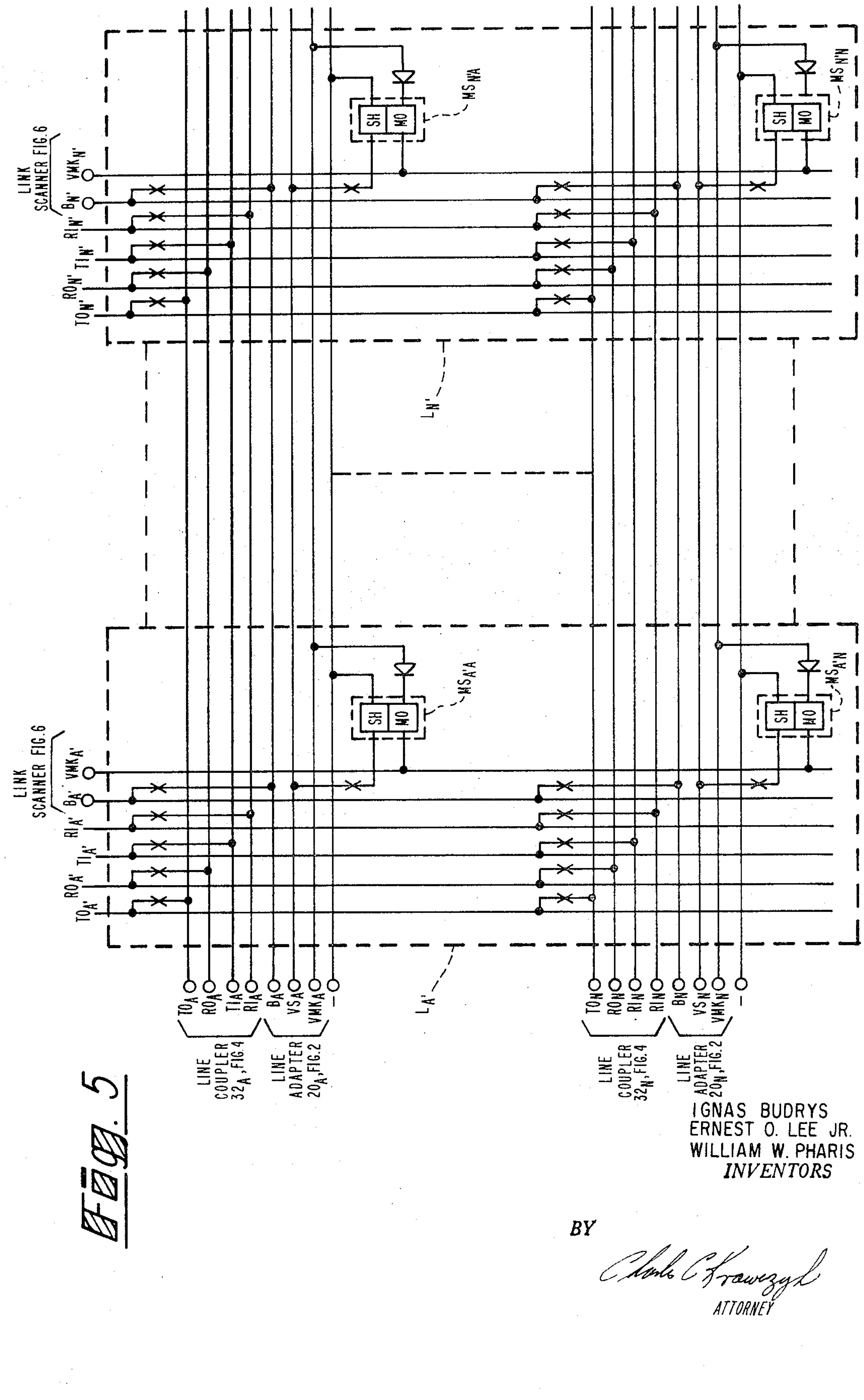
FIG. 5 shows a typical switching matrix array suited for video connections.

FIG. 5 shows a one stage matrix of the type which could be used in the video matrix 26 for interconnecting the video conductors from the calling and called video telephone stations (through their respective line couplers) via a free link in a plurality of links (LA'-LN') of the matrix 26. Each link requires six leads, namely; T0, R0, T1, R1 which act as the paths for video transmission and reception, and B and VMK which connect to the link scanner 24. The connection of the video conductors involves eight leads, namely; T0, R0, T1, R1 which connect to the video telephone station through the associated line coupler (32A–32N), B, VS and VMK which connect to the associated line adapter (20A–20N) and a common lead to the negative terminal of a DC source. A dual coil relay MS is used to operate and hold the contacts of the crosspoints of the video matrix 26. A free link for interconnecting the calling and called stations is found through a scannning process provided by the link scanner 24 which is shown in detail in FIG. 6. The link scanning process is initiated by the mark signal APM pulse generated by the line adapter scanner 22 which is detected on the APM lead of the link scanner 24.

Figure 6:
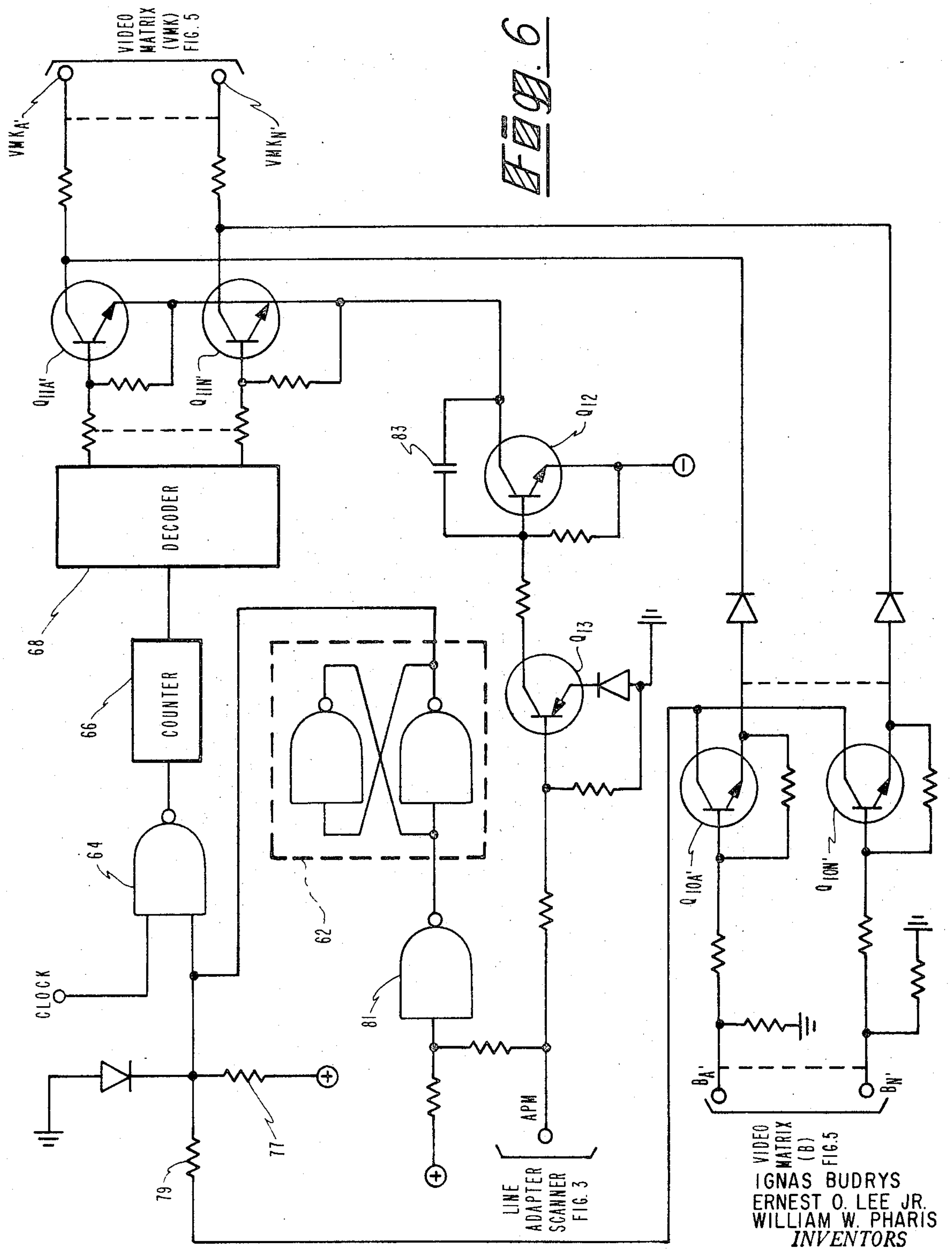
FIG. 6 shows details of the link scanner of FIG. 1.

As shown in FIG. 6, the B lead of each link (LA'-LN') of the video matrix 26 is connected to a different one of a plurality of input leads BA'–BN' of the link scanner 24 (N' corresponding to the number of links in the matrix). Each of the leads BA'–BN' is connected to the base of a different one of a plurality of transistors Q10A'–Q10N', each of which has its collector-emitter path connected in series with the following: a battery whose positive DC terminal is commonly connected to all the collectors of the Q10 transistors through resistors 77 and 79, the collector-emitter path of an individual one of a plurality of transistors Q11A'–Q11N' and the collector-emitter path of a transistor Q12 whose emitter is connected to a negative DC terminal. The transistor Q12 is rendered conductive when a transistor Q13 is forward biased by the negative mark signal APM pulse applied on the APM lead from the line adapter scanner 22. This negative pulse sets a latching circuit 62 via an inverter circuit 81 which provides an enable signal to a NAND gate 64, thus, permitting clock pulses to be transmitted to a counter 66. The output of the counter 66 operates a decoder 68 which sequentially applies a short positive pulse to a plurality of output leads, each output lead being connected to the base of a different one of the plurality of Q11 transistors. This sequentially forward biases each of the Q11 transistors. Current will not flow through the collector-emitter path of a forward biased Q11 transistor, however, if the associated Q10 transistor is reverse biased, such as by the application of a negative DC potential at its base. Since each of the BA'–BN' leads of the link scanner 24 is connected between the base of an individual Q10 transistor and the B lead of an individual link in the video matrix 26, the presence or absence of a negative potential on the B lead can be used to determine if a link is busy or idle. If a link is busy, a negative potential is present on its B lead via the B leads (FIG. 2) of the two line adapters connected thereto through the closed contacts of the operated crosspoints (FIG. 5) which prevents the corresponding Q10 transistors from conducting. If a link is idle, no negative potential is present on the B lead and the Q10 transistor permits current to pass through its collector-emitter path when its associated Q11 transistor is enabled by a forward biasing pulse (along the series path previously described). This stops the link scanning process since the current flow through resistors 77 and 79, disables the NAND gate 64 from passing clock pulses to the counter 66. This also resets the latching circuit 62 so that when the negative pulse in the APM lead terminates, the link scanner 24 is ready for the next link scanning request (a capacitor 83 connected between the collector and base of transistor Q12 ensures that the current through resistors 77 and 79 is maintained momentarily after the termination of the APM pulse to keep the latching circuit 62 reset).

The collector of each Q11 transistor is connected to the VMK lead of a different link in the video matrix 26 through an individual one of a plurality of current limiting resistors. Once the link scanner 24 stops at an idle link, a dual coil relay MS (as shown in FIG. 5, MSA'A for line adapter A and MSA'N for line adapter N, assuming link A' is idle) is acutated by a current which flows through its operate coil MO between ground and the closed contacts MK1 in the line adapter on one side of the coil (via the VMKA and VMKN leads) an the negative DC potential at the emitter of transistor Q12, the collector-emitter path of transistor Q12 and the associated Q11 transistor and the current limiting resistor connected to the collector of the associated Q11 transistor in the link scanner 24 on the other side of the coil (via lead VMKA'). This closes all the MS relay contacts of the crosspoints in the video connection path between stations A and N through the first free link (LA') identified by the link scanner 24.

Once the MS relay contacts of the crosspoints are closed, each relay is held closed by the holding coil SH of the MS relay which is connected to ground through the collector-emitter path of transistor Q8 (FIG. 2) via the VS lead on one side of the coil and the negative DC potential on the other side of the coil. When the mark signal APM pulse from the line adapter scanner 22 terminates the operate coils MO of the MS relays are deenergized. The crosspoints of the video path through the video matrix are held throughout the coil indirectly by the grounds on the S leads from the telephone line circuits since it is these grounds which maintain the VS relays in the line adapters energized and the VS2 contacts closed causing grounds to be applied on the VS leads to the video matrix 26. When the call is terminated, the grounds on the S leads are removed, the VS relays drop out, the grounds via the VS leads are removed from the video matrix 26 and the contacts of the video matrix crosspoints open after the video connection is broken.

The auxiliary switching system just described can be facilely used to supplement an existing telephone switching system to provide video connection switching capability. As long as approriate control signals from the existing switching system are received (corresponding to the standard sleeve grounds, AC ringing current and DC potential in a telephone system) the auxiliary switching system can be used for establishing different type electrical connections in other areas. The description of the auxiliary switching system in the context of a telephone system is in no way intended to limit its features or scope of operation.

What is claimed is:

1. In combination with a switching system for establishing a first electrical path between any two stations in a plurality of stations, an auxiliary switching system for establishing a second electrical path therebetween comprising:

circuit means for identifying the two stations to be interconnected via the second electrical path after the establishment of the first electrical path, said identification being enabled by mark signals generated by said auxiliary switching system in response to signals translated via the first electrical path through said other switching system, and switching means responsive to said mark signals for establishing the second electrical path between the two identified stations.

2. In combination with a telephone switching system for establishing an audio path between any two stations in a plurality of stations, an auxiliary switching system for establishing an auxiliary path therebetween comprising:

circuit means for identifying the two stations to be interconnected via the auxiliary path after the establishment of the audio path, said identification being made through mark signals generated by said auxiliary switching system in response to signals translated over the audio path through the telephone switching system, and switching means responsive to said mark signals for establishing the auxiliary path between the two identified stations.

3. The auxiliary switching system of claim 2 wherein said circuit means includes a plurality of identifying circuits corresponding in number to said plurality of stations, each of said identifying circuits being associated with a different one of said stations connected so that whenever two stations are to be interconnected via said auxiliary path, the two identifying circuits associated therewith generate said mark signals in response to signals received over said audio path via said telephone switching system.

4. In combination with a telephone switching system for establishing an audio path between any two stations in a plurality of stations wherein each of said plurality of stations is connected to said telephone switching system through a separate line circuit, an auxiliary switching system for establishing an auxiliary path therebetween comprising:

a switching matrix;

individual circuit means separately connecting each of said plurality of stations to said switching matrix;

circuit means connected to the line circuits and said switching matrix for applying mark signals to said matrix to identify the two stations to be interconnected via the auxiliary path in response to signals translated over the audio path through the telephone switching system via the line circuits of said two stations, and matrix scanning means connected to said circuit means and said switching matrix for selecting a free path through said switching matrix to interconnect said two identified stations.

5. The auxiliary switching system of claim 4 wherein said circuit means includes:

a plurality of identifying circuits corresponding in number to said individual line circuits, each of said identifying circuits being connected to a different one of said line circuits so that the two line circuits of said two stations to be interconnected apply enabling signals to their respective identifying circuits.

6. The auxiliary switching system of claim 5 wherein said circuit means includes:

a scanning circuit which locates the identifying circuit of a first one of said two stations through a request signal generated in said identifying circuit in response to the application thereto of an audio ringing signal and a signal indicating the completion of the audio path, said signals being translated over the audio path via the line circuit connected to said identifying circuit.

7. The auxiliary switching system of claim 6 wherein:

the identifying circuit of said first station applies said mark signal to said switching matrix in response to said request signal in conjunction with a mark enable signal generated by said scanning circuit and applied to all the identifying circuits simultaneously by said scanning circuit upon locating the identifying circuit of said first station.

8. The auxiliary switching system of claim 7 wherein said circuit means includes:

a tone generator which is enabled by the cooperation of said request and mark enable signals to transmit a tone signal through the identifying circuit of said first station via the audio path to the identifying circuit of the second station so that the identifying circuit of said second station applies said mark signal to said switching matrix in response to said tone signal cooperating with said mark enable signal.

9. The auxiliary switching system of claim 8 wherein:

said matrix scanning means is enabled by said mark enable signal to apply a scan signal to said switching matrix which cooperates with said two mark signals to interconnect said two stations via a free path in said switching matrix.

10. The auxiliary switching system of claim 9 wherein:

said two identifying circuits apply hold signals to said switching matrix for maintaining the auxiliary path between the two interconnected stations throughout the duration of the call in response to said enabling signals and a sleeve signal generated by said scanning circuit.

11. The auxiliary switching system of claim 4 wherein: each of said individual circuit means includes: a transmit pair and a receive pair of conductors, and switching means connected in series with said transmit and receive pair of conductors responsive to signals from said circuit means to connect the transmit pair of conductors from one station to the receive pair of conductors from the other station.

12. The auxiliary switching system of claim 11 wherein each of said individual circuit means includes: amplifying circuit means connected in series with at least one of said pairs of transmit and receive conductors.

* * * * *